United States Patent
Iott et al.

(10) Patent No.: US 10,639,974 B2
(45) Date of Patent: May 5, 2020

(54) SYSTEM FOR CONTROLLING A SUNROOF OF A VEHICLE

(71) Applicant: Webasto SE, Stockdorf (DE)

(72) Inventors: Phillip Iott, Stockdorf (DE); Scott Adams, Stockdorf (DE)

(73) Assignee: Webasto SE, Stockdorf (DE)

( * ) Notice: Subject to any disclaimer, the term of this patent is extended or adjusted under 35 U.S.C. 154(b) by 265 days.

(21) Appl. No.: 15/386,837

(22) Filed: Dec. 21, 2016

(65) Prior Publication Data

US 2018/0170157 A1   Jun. 21, 2018

(51) Int. Cl.
*B60J 7/043* (2006.01)
*B60J 7/057* (2006.01)
*B60R 16/023* (2006.01)

(52) U.S. Cl.
CPC .............. *B60J 7/0573* (2013.01); *B60J 7/043* (2013.01); *B60R 16/023* (2013.01)

(58) Field of Classification Search
CPC ......... B60J 7/0435; B60J 7/0573; G07C 5/08; G07C 5/0841; B60R 16/023
See application file for complete search history.

(56) References Cited

U.S. PATENT DOCUMENTS

| | | | | |
|---|---|---|---|---|
| 4,835,449 A | * | 5/1989 | Huehn | B60J 7/0573 296/223 |
| 5,671,996 A | * | 9/1997 | Bos | B60Q 3/85 362/140 |
| 2004/0032675 A1 | * | 2/2004 | Weller | B60R 1/12 359/872 |
| 2005/0240837 A1 | * | 10/2005 | Dubois | G06F 11/2236 714/712 |
| 2007/0119100 A1 | * | 5/2007 | Nakada | E05F 15/695 49/350 |
| 2009/0121664 A1 | * | 5/2009 | Sugimoto | H02P 6/12 318/400.09 |
| 2010/0032993 A1 | * | 2/2010 | Yoshida | B60J 7/0573 296/223 |
| 2010/0152955 A1 | * | 6/2010 | Holzinger | H04L 1/24 701/31.4 |
| 2011/0190962 A1 | * | 8/2011 | Peterson | G06F 7/00 701/2 |
| 2013/0340341 A1 | * | 12/2013 | Shibata | E05F 15/40 49/25 |

* cited by examiner

*Primary Examiner* — Stephen Holwerda
(74) *Attorney, Agent, or Firm* — Boyle Frederickson, S.C.

(57) ABSTRACT

A system is provided for gaining access to a sunroof of a vehicle, in particular a car, including a sunroof control unit (19) and a sunroof actuation switch (27), in particular, for actuation of opening and/or closing and/or tilting of a sunroof. The sunroof actuation switch has one switch contact (28) or a plurality of switch contacts, wherein the sunroof control unit (19) and the sunroof actuation switch (27) are re-configured to communicate data, such as programming and/or reprogramming data and/or parameter setting data and/or diagnostic data, from and/or to the sunroof control unit (19) through the one switch contact (28) or at least one of the plurality of switch contacts.

8 Claims, 1 Drawing Sheet

SYSTEM FOR CONTROLLING A SUNROOF OF A VEHICLE

FIELD OF THE INVENTION

The present invention relates to a system for controlling a sunroof of a vehicle, a sunroof system for a vehicle, in particular, a car, and a method of communicating with a sunroof control unit of a vehicle.

BACKGROUND AND SUMMARY OF THE INVENTION

According to the prior art, in case of a recall event for software or parameter updates with respect to a high volume low-cost sunroof, significant (disassembly) work is required to obtain access to the sunroof control unit, in particular a sunroof control unit (serial) data pin. Typically, fragile headliners have to be removed, together with other trim panels. Once accessible, the control unit can be reprogrammed/flashed or removed and replaced.

For other sunroofs/vehicles, software and parameter updates can be made via (serial) data lines connected through a gateway or through CAN (Controller Area Network)/WiFi/BLUETOOTH wireless technology/Nearfield communication to terminals such as an OBDII (Onboard Diagnose II) port. Such communication requires significant costs for the sunroof control unit, bandwidth of the vehicle and significant R&D (on the OEM side as well as the supplier side) and validation costs.

In general, to obtain data access via disassembling is costly, time-consuming and introduces secondary quality risks. Moreover, it is an added expense and liability on the OEM side to provide access to small, optional, non-mission critical ECUs (Electronic Control Units) such as sunroof controllers. Small ECUs do not warrant the consumption of limited vehicle network bandwidth. Therefore, OEMs, typically will not allow them on their network or provide easy access to data pins. Prior art such as CAN, WiFi, BLUETOOTH wireless technology, Nearfield, requires significant costs to the ECU as well. A wireless version exposes a certain level of security risk.

It is an object of the present invention to propose a system for controlling a sunroof of a vehicle, a sunroof system, a vehicle, in particular car, and a method of communicating with a sunroof control unit of a vehicle, wherein a simple communication, in particular (serial) data transmission is accomplished with comparatively low time consumption and costs.

According to a first aspect of the invention, a system for gaining access to (and/or controlling of and/or communicating with) a sunroof of a vehicle, in particular car, is proposed, wherein the system comprises a sunroof control unit and a sunroof actuation switch, in particular for actuation of opening and/or closing and/or tilting of a sunroof, the sunroof actuation switch having one switch contact or a plurality of switch contacts, wherein the sunroof control unit and the sunroof actuation switch are (re-)configured to communicate data, such as programming and/or reprogramming data and/or parameter setting data and/or diagnostic data, from and/or to the sunroof control unit through the one switch contact or at least one of the plurality of switch contacts.

A central aspect of the invention is the configuration of the sunroof control unit (and the sunroof actuation switch) such that (serial) data can be communicated through one of the switch contacts of the actuation switch. Thereby, disassembly work for data access may be reduced. In particular, if a switch bezel is provided which can be removed by unsnapping/unscrewing to gain access to switch wires, disassembly work can be substantially reduced. Additional expense and liability on the OEM side for providing access to small, optional, non-mission critical ECUs may be reduced or eliminated. Additional consumption of vehicle network bandwidth by the sunroof control unit would not arise. Expensive hardware which is, usually needed for CAN, WiFi, Bluetooth, Nearfield will not be necessary. For example, only a (simple) diverter circuitry such as an (analogue) SPDT (Single Pole Double Throw) may be provided. Any security risk due to vehicle access through complex hardware would no longer apply. Additional R&D expense and qualification for the OEM network would not be necessary.

For example, one of the existing switch wires may be converted into a (serial) data link to the sunroof control unit (in particular ECU), preferably in order to allow a (temporary) diagnostic and/or service mode. In general, such access may be used for diagnostics (for warranty investigations or campaigns or the like), profile analysis at vehicle plants and in the field and/or to re-flash parameters or parts of or the entire software. New software may be provided to recognize a switch activation (or a combination of switch activation) that may put the sunroof control unit into a diagnostic or service mode. The software may execute the service mode and/or reprogram one of the control unit ports (microprocessor ports) to enable (serial) data going out on a switch line such as the sunroof opening switch line. Additional hardware may be provided that may connect an input and/or output means of the sunroof control unit for data transmission (e.g. LIN/K-Bus/UART; LIN as abbreviation for Local Interconnect Network, K-Bus as abbreviation for Communication Bus of the Vehicle and UART as abbreviation for Universal Asynchronous Receiver/Transmitter).

Simple electrical connectivity (e.g. for flashing) through, a (at least partly) removed actuation switch, in particular actuation switch module or bezel is achieved.

Preferably, the actuation switch comprises a removable switch module, in particular bezel, for allowing access to at least one (inner) switch connector, in particular wire, of the actuation switch. Such switch module (in particular bezel) may be temporarily removed for performing any programming and/or reprogramming and/or parameter setting and/or diagnostic action.

A snap-in and/or screwing mechanism may be provided for a mechanical connection of the switch module, in particular bezel, with the remaining parts of the actuation switch. Thereby, simple access to one or more of the switch contacts can be accomplished.

A diverter switch, in particular a SPDT (Single Pole Double Throw) may be provided, for diverting a line between the actuation switch and the control unit so that said line can be connected to either a first input means of the control unit for receiving an actuation command such as opening or closing or tilting of the sunroof, or to a second input and/or output means of the control unit for transmitting, and/or receiving the data. Such diverter switch may connect one of the switch contacts to the second input and/or output means (e.g. serial bus). The control unit may divert (serial) communication to the sunroof control switch, for example based on a corresponding command. The sunroof control unit may be flashed with a corresponding tool, through a switch input/wire. In any event, a simple structure for establishing necessary connections is achieved.

The diverter switch may be controllable by the actuation switch, for example by holding the actuation switch in a predetermined position, e.g. a (sunroof) closing command position, preferably for a predetermined time period such as for more than 3 s or more than 5 s or more than 10 s and/or by a series of pulses ("switch dance"), optionally on more than one line.

The control unit may comprise a microprocessor.

The system for controlling a sunroof of a vehicle may comprise an external control and/or monitoring and/or diagnose unit (tool) being connectable to at least one of the switch contacts for data, transmission. Hence, a simple data transmission or data communication between the control unit and the external unit can be accomplished.

According to a further aspect of the invention, a sunroof system comprising the above system for controlling a sunroof of, a vehicle and the sunroof is provided.

According to a further aspect of the invention, a vehicle, in particular car, comprising the above sunroof system is provided.

According to another aspect of the invention, a method of communicating with a sunroof control unit of a vehicle, in particular car, preferably utilizing the above system for controlling the sunroof of the vehicle and/or the above sunroof system and/or the above vehicle, is provided, wherein the method comprises a step of communicating data, such as programming and/or reprogramming data and/or parameter setting data and/or diagnostic data, from and/or to the sunroof control unit through a switch contact of sunroof, actuation switch, in particular for actuation of opening, and/or closing and/or tilting of the sunroof.

According to a further aspect of the invention, a use of a switch contact of a sunroof actuation switch, in particular for actuation of opening, and/or closing and/or tilting of the sunroof, is provided, for communicating data, such as programming and/or reprogramming data and/or parameter setting data and/or diagnostic data, from and/or to a sunroof control unit. Preferably, the above system for controlling the sunroof of the vehicle is used and/or the above sunroof system is used and/or the above vehicle is used and/or the above method of controlling a sunroof control unit of a vehicle is used.

BRIEF DESCRIPTION OF THE DRAWINGS

In the following, a preferred embodiment of the invention is described with reference to the drawings. These show.

DETAILED DESCRIPTION OF THE DRAWINGS

Figure 1:
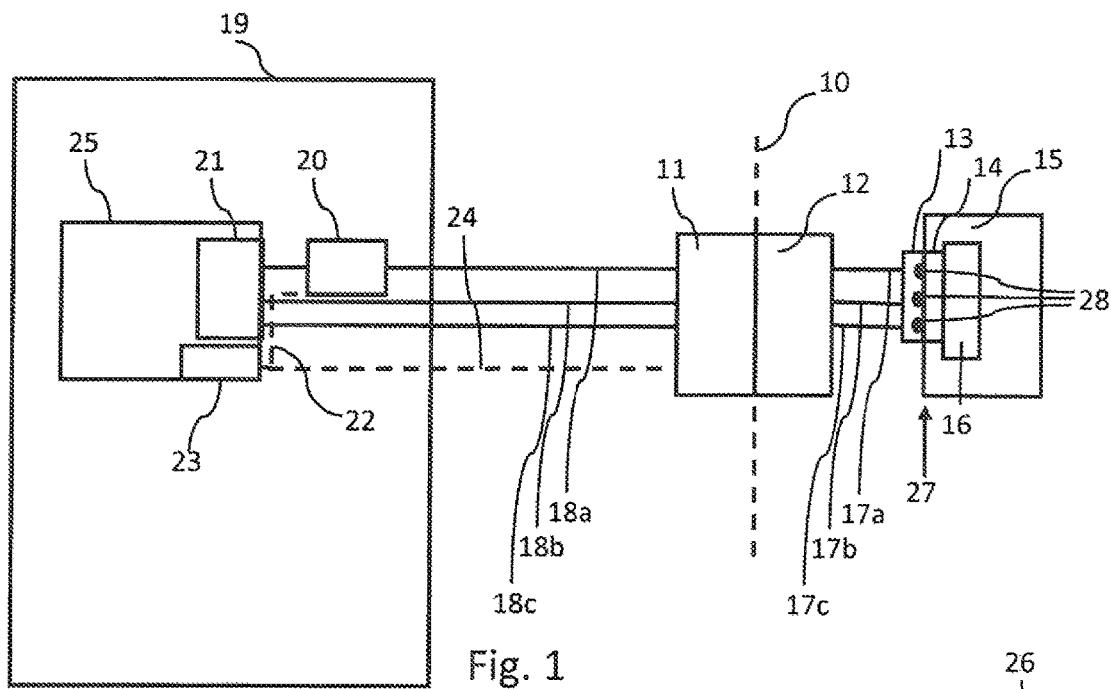
FIG. 1 a schematic of a system for controlling a sunroof of a vehicle.

FIG. 1 shows a sunroof control system, wherein a sunroof side of the system and a vehicle side of the system is separated by a broken line 10. The sunroof system and the vehicle (rest of the vehicle) are connected via a sunroof connector 11 and a vehicle connector 12. The vehicle connector 12 is connected with a first switch module connector 13. The first switch module connector 13 is connected with a second switch module connector 14. The second switch module connector 14 is part of a vehicle switch module 15 which allows generating an opening, tilting or closing command by the user. For generating the opening, closing and tilting command, the switch module 15 may comprise a switch button 16 (or several switch buttons). An opening command can be transmitted from the switch module 15 to the vehicle connector 12 by a transmission line 17a. Correspondingly, a closing command can be transmitted by transmission line 17b and a tilting command can be transmitted by transmission line 17c. Via the sunroof connector 11 and further transmission lines 18a, 18b and 18c, the opening, closing and tilting commands can be transmitted to a control unit 19 of the sunroof control system. Again, transmission line 18a may transmit an opening command, transmission line 18b may transmit a closing command and transmission line 18c may transmit a tilting command. In this context, the commands are interchangeable or in other words, it is not essential which of the lines 18a to 18c transmits which command. Moreover, it is not necessary (but possible) that transmission lines 17a to 17c or 18a to 18c are provided by separated lines. It is also possible to provide a reduced number of lines (e.g. one or two) e.g. when using a bus connection. In the example of FIG. 1, within transmission line 18a, a diverter switch 20 is arranged. This diverter switch 20 allows to divert a signal of the transmission line 18a either in the direction of a switch input (and output) means 21 or (via transmission line 22=broken line in the drawings) to an input and/or output means 23 for receiving and/or transmitting (serial) data, such as programming and/or reprogramming data and/or parameter setting data and/or diagnostic data. A further transmission line 24 allows communication between the sunroof connector 11 and the input and/or output means 23 (without using one of the transmission lines 18a to 18c) for transmission of commands from the switch module 15. Lines 18a to 18c allow at least for unidirectional communication from the sunroof connector 11 to the control unit 19, preferably bidirectional connection. Transmission line 24 and transmission line 22 (together with the part of transmission 18a between sunroof connector 11 and diverter switch 20) allow at least unidirectional communication (either from the sunroof connector 11 to the control unit 19 or from the control unit 19 to the sunroof connector 11) or preferably bidirectional communication. Similarly, transmission line 17a to 17c allow at least unidirectional transmission (e.g. in the direction from the first switch module connector 13 to the vehicle connector 12). Preferably, in particular the transmission line 17a allows bidirectional communication. Also the transmission lines 17b and 17c may allow bidirectional transmission.

An actuation switch 27 for actuation of opening, closing and tilting of the sunroof comprises the switch module 15 and the first switch module connector 13. The first switch module connector 13 has several (e.g. three) switch contacts 28.

For example, an opening command can be transmitted from the vehicle switch module 15 via transmission line 17a and 18a to the switch input (and/or output) means 21. In this case, the diverter switch 20 is switched so that, a connection between the diverter switch 20 and the input and/or output means 23 is interrupted and a connection between the diverter switch 20 and the switch input and/or output means 21 is established.

The switch input (and/or output) means 21 and the input and/or output means 23 may be part of an ECU (Electronic Control Unit) 25.

The (data) input and/or output means 23 may be configured for LIN (Local Interconnect Network)/K-Bus (communication bus of the vehicle)/UART (Universal Asynchronous Receiver/Transmitter) connectivity.

Figure 2:
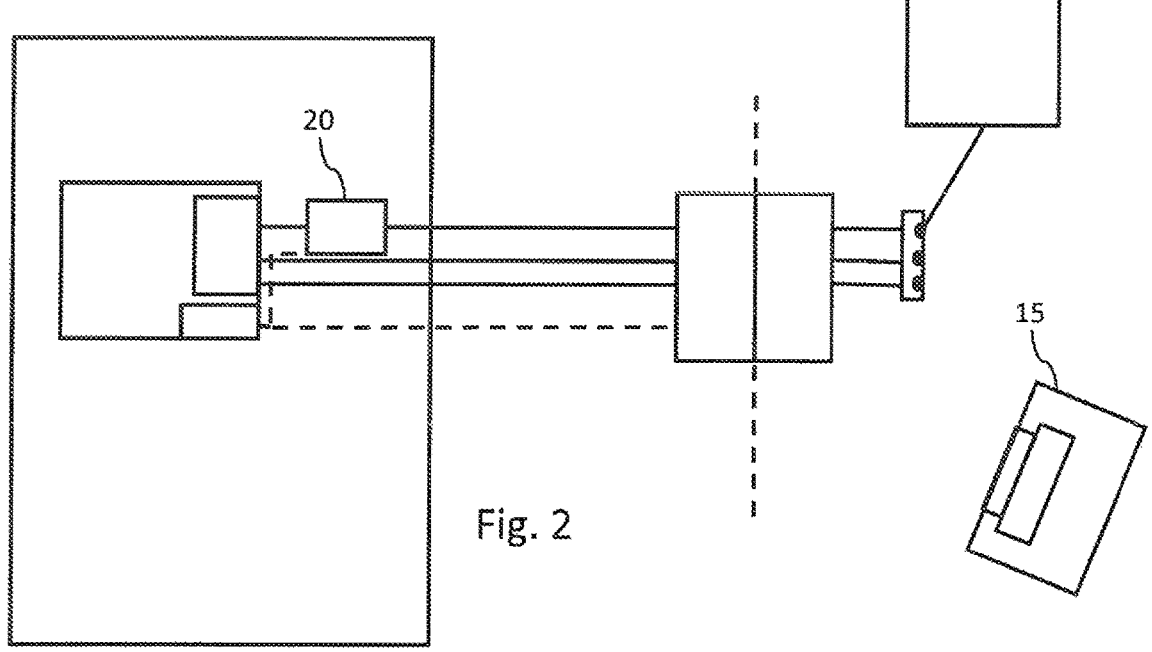
FIG. 2 a schematic of the system of FIG. 1 with removed switch module and connected external unit.

In FIG. 2, the vehicle switch module 15 is removed and an external unit (e.g. diagnose unit) 26 is connected to the first switch module connector (in particular to a transmission wire, e.g. the transmission line 17c). In this case, the diverter switch 20 may be switched so that it is connected with the input and/or output means 23, whereas a connection between the diverter switch 20 and the switch input (and/or output) means 21 is interrupted.

In general, electrical connectivity (e.g. for flashing) through the removed vehicle switch module 15 is obtained. The input and/or output means 23 (e.g. serial bus) can be connected to the first switch module connector 13 (to a switch input) via diverter switch 20. Communications (serial communications) to the vehicle switch module 15 may be diverted based on, for example, a 10 s hold of a closing switch (button or other structure) and/or on a series of pulses ("switch dance"). The sunroof controller can then be flashed, with a tool (such as a diagnose tool) through the switch input (wire). Access to the first switch module connector 13 or a switch wire in general may be established by removing a bezel (not shown in the figures).

When removing the vehicle switch module, a switch wiring/connector may be accessible to switch the sunroof control unit for example into a diagnostic mode in order to gain access to data and/or in order to reprogram.

If the switch bezel is accessible, it can be simply removed (temporarily). Then, for example a new tool to perform a combination of switch activations ("switch dance") that puts the sunroof control unit into a diagnostic or service mode can be connected. An additional software to recognize the combination of switch activations ("switch dance") and to execute a service mode and re-purpose one of the control unit ports (microprocessor ports) to enable (serial) data to go out on a switch line such as the "opening" switch line may be provided. Additional hardware that can connect for example a LIN/K-Bus/UART connectivity to one of the sunroof switch lines may be provided.

Figure 3:
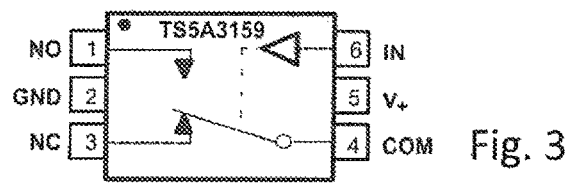
FIG. 3 an embodiment of a diverter switch.

FIG. 3 shows an embodiment for the diverter switch 20 of FIGS. 1 and 2. The switch diverter unit 20 may be provided by a TS5A3159 analogue switch. In FIG. 3, NO identifies an input/output port (normally open switch port); GND identifies ground; NC identifies an input/output port (normally closed switch port); COM identifies an input/output port (common switch port); V+ identifies power supply; and IN identifies an input port (switch select; high=COM connected to NO; low=COM connected to NC).

The invention claimed is:

1. A system for gaining access to a sunroof of a vehicle, comprising:
    a sunroof control unit (19) and a sunroof actuation switch (27) operatively connected to the sunroof of the vehicle for actuation of opening and/or closing and/or tilting of the sunroof, the sunroof actuation switch (27) having one switch contact (28) or a plurality of switch contacts; and
    a diverter switch (20) including a single pole, double throw (SPDT) switch for diverting a line (18a) between the actuation switch (27) and the control unit (19) so that said line (18a) can be connected to either a first input means (21) of the control unit for receiving an actuation command opening or closing or tilting of the sunroof, or to a second input and/or output means (23) of the control unit (19) for transmitting and/or receiving the data;
wherein:
    the sunroof control unit (19) and the sunroof actuation switch (27) are configured to communicate programming and/or reprogramming data and/or parameter setting data and/or diagnostic data, from and/or to the sunroof control unit (19) through the one switch contact (28) or at least one of the plurality of switch contacts
    the actuation switch (27) comprises a removable switch module (15) including a bezel for allowing access to at least one inner switch connector including a wire of the switch (27);
    the removable switch module (15) comprises one or a plurality of switch buttons (16) for generating the opening and/or closing and/or tilting commands; and
    the diverter switch (20) is controllable by the actuation switch (27) by holding the actuation switch in a predetermined position for a predetermined time period by a series of pulses on at least one line.

2. The system of claim 1, characterised by a snap-in and/or screwing mechanism for a mechanical connection of the switch module (15) with the remaining parts of the switch (27).

3. The system of claim 1, characterised in that the diverter switch (20) is controllable by the actuation switch (27) by holding the actuation switch in a predetermined position for more than 3 s by a series of pulses on at least one line.

4. The system of claim 1, characterised in that the control unit (19) comprises a microprocessor.

5. The system of one claim 1, characterised by an external control and/or monitoring and/or diagnose unit (26) being connectable to at least one of the switch contacts (28) for data transmission.

6. The system of claim 1, characterized by the vehicle being a car.

7. A method of communicating with a sunroof control unit (19) of a vehicle comprising a step of communicating programming and/or reprogramming data and/or parameter setting data and/or diagnostic data, from and/or to the sunroof control unit through a switch contact (28) of a sunroof actuation switch (27) for actuation of opening and/or closing and/or tilting of a sunroof, the sunroof control unit comprising a diverter switch (20) which is controllable by the actuation switch (27) by holding the actuation switch in a predetermined position for a predetermined time period by a series of pulses on at least one line so that said line (18a) can be connected to ether a first input means (21) of the control unit for receiving an actuation command opening or closing or tilting of the sunroof, or to a second input and/or output means (23) of the control unit (19) for transmitting and/or receiving the data;
wherein:
    the actuation switch (27) comprises a removable switch module (15) including a bezel for allowing access to at least one inner switch connector including a wire of the actuation switch (27); and
    the removable switch module (15) comprises one or a plurality of switch buttons (16) for generating opening and/or closing and/or tilting commands.

8. A use of a switch contact (28) of a sunroof actuation switch (27) for actuation of opening and/or closing and/or tilting of a sunroof, for communicating programming and/or reprogramming data and/or parameter setting data and/or diagnostic data, from and to a sunroof control unit, the sunroof control unit comprising a diverter switch (20) which is controllable by the actuation switch (27) by holding the actuation switch in a predetermined position for a predetermined time period by a series of pulses on at least one line so that said line (18a) can be connected to either a first input means (21) of the control unit for receiving an actuation command opening or closing or tilting of the sunroof, or to a second input and/or output means (23) of the control unit (19) for transmitting and/or receiving the data;
  wherein:
    the actuation switch (27) comprises a removable switch module (15) including a bezel for allowing access to at least one inner switch connector including a wire of the actuation switch (27); and
    the removable switch module (15) comprises one or a plurality of switch buttons (16) for generating opening and/or closing and/or tilting commands.

* * * * *